United States Patent [19]

Mason

[11] 4,177,358

[45] Dec. 4, 1979

[54] TONE DIAL TOLL RESTRICTOR

[76] Inventor: John W. Mason, Rte. 1, Box 153, Wirtz, Va. 24184

[21] Appl. No.: 917,760

[22] Filed: Jun. 21, 1978

Related U.S. Application Data

[63] Continuation of Ser. No. 716,035, Sep. 9, 1976, abandoned, which is a continuation of Ser. No. 506,553, Sep. 16, 1974, abandoned.

[51] Int. Cl.² .................................................. H04M 1/66
[52] U.S. Cl. ................................................ 179/18 DA
[58] Field of Search ......... 179/18 DA, 84 VF, 7.1 R, 179/7 R, 27 CB, 90 D

[56] References Cited

U.S. PATENT DOCUMENTS

| | | | |
|---|---|---|---|
| 3,448,221 | 6/1969 | Suala | 179/18 DA |
| 3,692,951 | 9/1972 | Hestad et al. | 179/27 CB |
| 3,798,381 | 3/1974 | Piacente et al. | 179/18 DA |
| 3,831,175 | 8/1974 | Mazalas | 179/84 VF X |
| 3,851,109 | 11/1974 | Downs et al. | 179/18 DA |
| 3,872,260 | 3/1975 | Oatis | 179/18 DA |
| 3,899,640 | 8/1975 | Piacente et al. | 179/18 DA |
| 3,902,024 | 8/1975 | Hijikata et al. | 179/99 |
| 3,920,936 | 11/1975 | Mogtader | 179/18 DA |
| 3,931,476 | 1/1976 | Matthews | 179/18 AD |
| 3,940,569 | 2/1976 | Schonbrun et al. | 179/18 DA |
| 4,095,056 | 6/1978 | Ewen | 179/18 DA |

Primary Examiner—Thomas W. Brown
Attorney, Agent, or Firm—Sughrue, Rothwell, Mion, Zinn and Macpeak

[57] ABSTRACT

Logic circuits including electronic switching are provided for admitting or rejecting signals from a dual multi-frequency telephone into a trunk line, or toll line, the initiating control of which is provided from a dial tone signal feeding a detection circuit whereby selective recognition of coded signals permits further processing into the trunk line, there being additional, specific logic circuits for preventing further processing of the coded signals when a "zero" or a "one" numerical digit is recognized as the first signal. If the dial tone signal is not detected, the telephone line connected to a telephone is held at a voltage polarity which prevents dialed signals from the telephone from reaching the telephone line. When a dial tone is detected, the line polarity is reversed, thereby permitting dialed signals to reach the line.

6 Claims, 2 Drawing Figures

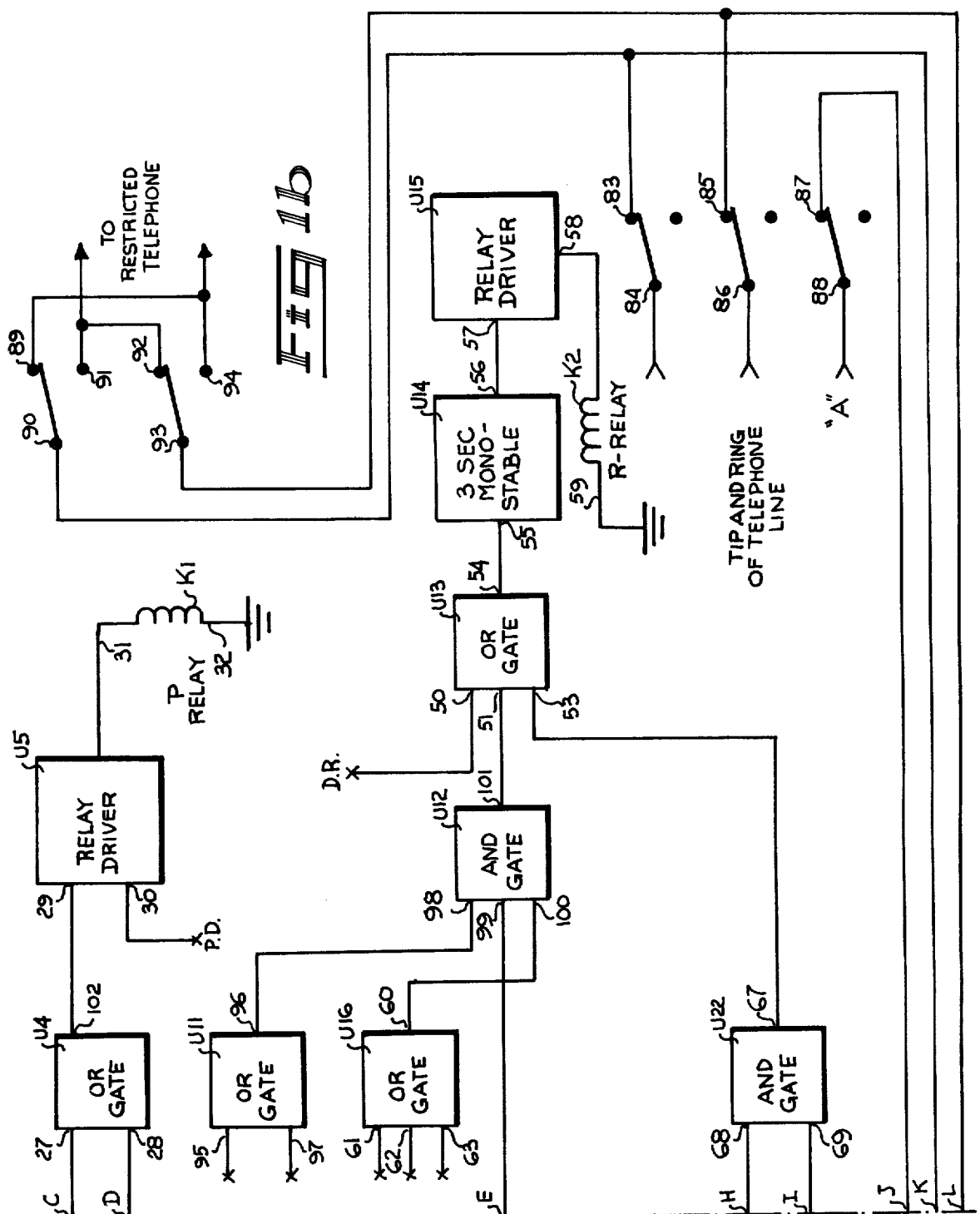

TONE DIAL TOLL RESTRICTOR

CROSS REFERENCE TO RELATED APPLICATION

This is a continuation application of application Ser. No. 716,035 filed Sept. 9, 1976, now abandoned, which is a continuation application of application Ser. No. 506,553 filed Sept. 16, 1974, now abandoned.

BACKGROUND OF THE INVENTION

Present public telephone systems adapted to direct long distance dialing offer increasing opportunities for unauthorized toll calls to be made from private telephone systems connected thereto as the complexity and sophistication of such systems progress. One such problem encountered is the restriction of dual tone multifrequency telephones due to signal detection timing between the dial tone source and that of the private exchange. Another problem occurs when the controlling exchange is able to respond to signals prior to the beginning of the dial tone signal. Still other problems concern the recognition of dialed signals before dial tone commences and thereby bypassing the toll restrictor and the characteristics of some controlling exchanges to recycle after completion of a preceding call so that unauthorized calls are permitted to go through the trunk lines.

SUMMARY OF THE INVENTION

The present invention relates to a simplified toll restriction system wherein no call signals are passed into the controlling exchange until the dial tone signal occurs and whereby each time the dial tone signal recurs the system resets without permitting calls to go through to the trunk line until further verification. More specifically, if the dial tone signal is not detected, the telephone line connected to a telephone is held at a voltage polarity which prevents the dial signal from the telephone from reaching the telephone line. When a dial tone is detected, the line polarity is reversed, thereby permitting dialed signals to reach the line. Monitoring circuits for recognizing proper signals and restricting automatically such call signals as those where the first number dialed is a "zero" or a "one" are also provided.

DESCRIPTION OF THE DRAWING

The drawing is a line diagram of the logic circuits of the tone dial toll restrictor as shown in FIGS. 1a and 1b, these being arranged to form FIG. 1.

DETAILED DESCRIPTION

Figure 1A:
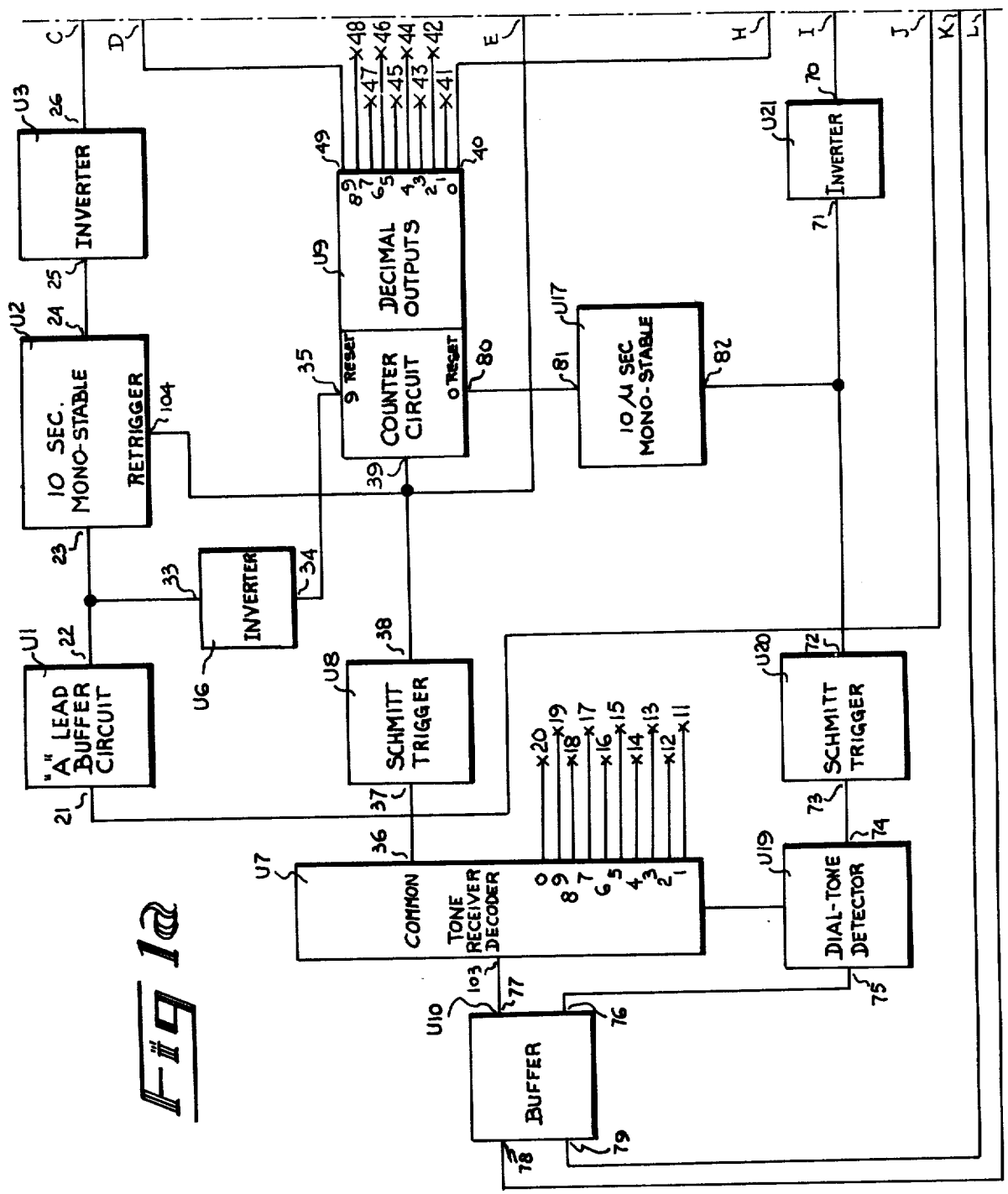

With reference to the drawing, a dual tone multifrequency telephone to be restricted from being connected to a trunk line such as indicated at 84 and 86 (FIG. 1b) has its dialing output connected to contacts 89, 94 and 91, 92 of a relay K1 (see FIG. 1b), the switching contacts 90 and 91 of which are connected respectively to lines K and L and also to contacts 83 and 85 (see FIG. 1b) of another relay K2 that is normally deenergized and having its switching contacts 84 and 86 resting on contacts 83 and 85, together with a third switching contact 88 cooperating with a normally closed contact 87 connected to line J.

Referring now to FIG. 1a, a monostable multivibrator U2 normally has a logical "0" output which is inverted by an inverter U3 and fed to an OR gate U4 (see FIG. 1b). The other input of the OR gate U4 is derived from a decimal counter U9 at the ninth count from output terminal 49, the counter U9 being reset to an output from terminal 49 by an input 35 derived from an inverter U6 as a result of an output from the "A" Lead Buffer Circuit U1 arising from the last previous use of the telephone; i.e., when the receiver was returned to the "hook." When the receiver is lifted from the "hook" a ground signal (logical 1) is always received via the line "A" (see FIG. 1b) resulting in a "0" being applied to input 27 of OR gate U4 due to the triggering of 10 second monostable multivibrator $U_2$. Nevertheless, the output of the OR gate U4 energizes relay K1 via a relay driver U5 (see FIG. 1b) because of the logical "1" present at the input 28 of the OR gate U4, the contacts of relay K1 (i.e., contacts 89, 91, 92 and 94 and switching contacts 90 and 93) being arranged to apply voltage of reverse polarity to prevent operation of the dual tone multifrequency telephone when relay K1 is energized. At this time another relay K2, previously referred to, is not energized and its contacts 83, 85 and 87 are closed respectively unto contacts 84, 86 and 88, the dual tone multifrequency telephone remaining connected to the line.

When the telephone receiver is lifted from the hook of the dual tone multifrequency telephone, a ground signal is applied to the line leading from contact 87 and switching contact 88 ("A"), FIG. 1b, to input 21 of the "A" Lead Buffer Circuit U1 providing a logical "1" signal to the input of the monostable multivibrator U2 causing its output 24 to produce a logical "1" signal for 10 seconds to inverter U3, which in turn, provides a logical "0" signal to OR gate U4 operating the driver U5 tending to de-energize relay K1. During this 10 second interval, if a dial tone signal is received from the exchange, a dial tone detector U19 generates a logical "1" which is applied to the Schmitt Trigger U20 (FIG. 1a) thereafter being fed to a monostable multivibrator U17 and causing the latter momentarily to have a logical "1" signal output. The momentary logical "1" input to the zero reset of counter U9 causes a logical "1" output at the zero decimal output 40 of the counter U9 and simultaneously causes all other decimal outputs of the counter to have logical "0" outputs of which the decimal output 9 (terminal 49) provides a logical "0" to the OR gate U4. Since the input 27 to the OR gate U4 is also at logical "0," the output of U4 is also logical "0," deenergizing the driver U5 and the relay K1. The contacts of relay K1 therefore transfer, reversing polarity connections to the dual tone multifrequency telephone, enabling it to provide coded signals into the lines K and L.

Should the caller dial a number of short duration so that the central trunk line removes the dial tone from the line, but the dual tone multifrequency receiver U7 (FIG. 1a) fails to detect the signal, the output of the dial tone detector U19 will be a logical "0," passing on the signal so that the output of the Schmitt Trigger U20 is also a logical "0" and is applied to an inverter U21 producing therefrom a logical "1" which is applied to an AND gate U22. The other input 68 of the AND gate is a logical "1" since the counter U9 is remaining at its logical "1" output as a result of no digit signals having been counted. Consequently, the AND gate U22 has a logical "1" output to the input of an OR gate U13, initiating operation of the 3 second monostable multivibrator U14, and its output to the relay driver U15 causes the relay K2 to become energized opening the contacts 83/84 and 85/86 disconnecting the telephone from the trunk line.

The toll restrictor system may also be connected so that specific digits dialed from the dual tone multifrequency telephone are used for control. For example, in direct dial systems, long distance trunk lines in some public telephone systems require a "one" or a "zero" to be dialed first in order to be connected to the trunk line. In the present restrictor system wired connections may be made to control the restrictor in that manner to prevent an unauthorized long distance call by making wire connections as follows:

(1) From the "one" digit of U9 to the input 95 of OR gate U11
(2) From the "two" digit of U9 to the input 97 of OR gate U11
(3) From the number "zero" output of U7 to the input 61 of OR gate U16
(4) From the number "one" output of U7 to the input 62 of OR gate U16

These connections will restrict calls where the first or second number dialed is either a "one" or a "zero." The OR gate U16 is a digit control having a maximum of 3 digits (positions) which can be wired selectively to the outputs 11 through 20 of dual tone multifrequency receiver U7 (tone receiver decoder).

Accordingly, when dialing is commenced, the signal goes through the buffer circuit U10 to the dual tone multifrequency receiver U7 and the corresponding numbered output (terminals 11 through 20 respectively correspond to decimal digits 1, 2, 3, etc. through 0), together with a common output 36, each output being a logical "1." The common output logical "1" is fed to the Schmitt Trigger U8 and thence to counter U9 via line 38/39 whereupon the "zero" digit (line 40) has a logical "0" output and the "one" digit (line 41) has a logical "1" output. The counter U9 is a digit counter wherein decimal outputs zero through nine are produced respectively at terminals 40 through 49. This logical "1" is fed to the OR gate U11 (via wire connection—see above) and produces a logical "1" output to the AND gate U12. The Schmitt Trigger U8 also provides its output to the AND gate U12 (via line 38/99).

If the number dialed is a "zero" or a "one" as the first number dialed from the dual tone multifrequency telephone under these conditions, restriction will take place. Let us assume it is a "zero." In this instance a logical "1" will be the output at the number "zero" of U7 and is applied to the input of OR gate U16 (via wire connection—see above), resulting in a logical "1" being applied to the input of AND gate U12. Since all three inputs to U12 are now at logical "1," its output is a logical "1" applied to OR gate U13 resulting in a logical "1" output to the three second monostable multivibrator U14 which in turn energizes the relay driver U15 and the relay K2 so that the contacts of relay K2 open and remove the calling telephone from the trunk line.

The present invention is also useful in preventing abuse by a caller dialing very slowly—pausing unnecessarily between numbers dialed—or by not dialing promptly after the receiver is removed from the "hook." In either instance the ten second monostable multivibrator U2 (FIG. 1a) will complete its cycle and its output will become a logical "0." This logic signal causes the output of inverter U3 to be a logical "1" and is fed to OR gate U4 and a similar logical "1" to relay driver U5 and also relay K1 thereby reversing the line polarity and preventing further effective dialing.

With respect to the preceding paragraph it is to be noted that normally, if the caller dials before the ten second monostable multivibrator U2 recycles, the common output 36 of the dual tone multifrequency receiver U7 is a logical "1" causing the Schmitt Trigger U8 to have a logical "1" output which is fed to the ten second monostable vibrator U2 (via line 38/104) whereby U2 begins its ten second timing cycle again.

This invention is also useful in restricting the number of decimal digits for controlling the admission or rejection of a call to a trunk line. Since most conventional telephones use a 7 digit code, let is be assumed that, if more than 7 digits are dialed, the present system will reject the call. To effect this operation, the following wire connection is made: from digit 7 (terminal 47) of U9 to P.D. input of U5 (see FIG. 1b). Now when the first dial tone is made the common output of the dual tone multifrequency receiver U7 will have a logical "1" output applied to the Schmitt Trigger U8 which will also have a logical "1" output, causing the ten second monostable multivibrator U2 to begin its timing cycle; however, the output of the Schmitt Trigger U8 is also applied to the counter circuit U9 causing it to advance one digit and at this time energize the decimal output to produce a logical "1" at output 41. This sequence is repeated each time a number is dialed until the seventh digit is dialed, whereupon a logical "1" is delivered (via the wire connection to P.D.) to the driver U5 which causes the relay K1 to reverse the line polarity of the voltage into which the dual tone multifrequency telephone is dialing—preventing further signals from being dialed.

Similarly, restriction can be accomplished by connecting a wire from any digit output of the counter U9 to D.R. input of OR gate U13 whereby one digit less than the number of the digit output connection from U9 can be dialed; i.e., if the connection was from digit 7 (terminal 47) as in the preceding paragraph, dialing would be prevented after six digits were received. The operation, however, of the circuit is somewhat different. After dialing is accomplished, leading to the 7th digit output logical "1" being delivered to the input of U13 (per wire connection), the latter has a logical "1" output which is fed to the three second monostable multivibrator U14 which in turn actuates the relay driver U15 and energizes relay K2 and causes its contacts to open—taking the calling telephone off the trunk line.

With respect to incoming calls to the dual tone multifrequency telephone, when the receiver is taken off the "hook," a ground signal is delivered through the "A" lead (line J) to buffer U1 which has thereby a logical "1" output that is fed to the ten second monostable multivibrator U2 giving it a logical "1" output. This output being fed to inverter U3 provides a logical "0" output to the input of OR gate U4; however, the output from U4 remains at its previous value, retaining the relay driver U5 and relay K1 energized. However, another condition of OR gate U4 is required to deenergize the driver U5 and the relay K1 such as a sequence commenced by dial tone detection (via U19) and an output from the counter U9 (via line 28) whereby both inputs to OR gate U4 would go to a logical "0" to bring the output of U4 to a logical "0." Since no dial tone exists on incoming calls, the ten second monostable multivibrator U2 completes its cycle resulting in a condition that keeps the relay K1 energized. This condition prevails until the incoming caller "hangs up" and again initiates a new call—preventing the telephone being called from dialing successfully if the calling party "hangs up" and the trunk line gives the party called a new connection.

I claim:

1. In a dual tone multi-frequency telephone system including a toll restrictor circuit, enabled by the initiation of a telephone call, for monitoring numbers dialed from a telephone connected to a telephone line and for disconnecting the telephone from the telephone line when a restricted number is dialed, the improvement comprising polarity-reversal means coupled to the telephone line for normally disabling the telephone dial by applying an original line voltage polarity to the telephone, and dial tone detector means, coupled between said polarity reversal means and the telephone line, and responsive to the presence of a dial tone for reversing the polarity of the telephone line connected to the telephone, enabling the telephone dial, and permitting dialed number signals to reach the connected telephone line.

2. The improvement of claim 1, wherein a permitted telephone number has a maximum number n of digits, and further comprising:
   counter means, coupled to the telephone line and to said dial tone detector means, and rendered operative by the detection of a dial tone, said counter means having at least n+1 counting stages; and
   logic circuit means coupled between said polarity reversal means and the n+1th stage of said counter means for restoring said line voltage to its original polarity so that the telephone dial is disabled after n digits have been dialed.

3. The improvement of claim 1, wherein the telephone system includes restrict means coupled to the telephone line and responsive to the toll restrictor circuit for disconnecting the telephone from the telephone line when a prohibited number is dialed after a dial tone has been detected.

4. The improvement of claim 1, further comprising timing means, enabled by the initiation of a telephone call and coupled to said polarity reversal means, for returning the telephone line to its original polarity if dialing does not occur within a predetermined timing period of said timing means, thereby again disabling the telephone dial after said predetermined period.

5. The improvement of claim 3, wherein said toll restrictor circuit comprises:
   counter means for sequentially counting the digit signals in a dialed number after a dial tone has been detected;
   decoder means for converting the dialed digit signals to a decimal code; and
   logic circuit means coupled to said counter means and to said decoder means for applying a control signal to said restrict means to disconnect the telephone from the telephone line when a prohibited digit appears at a selected position in the counting sequence.

6. The improvement of claim 5, wherein permitted telephone numbers have a predetermined maximum number n of digits, and wherein said counter means has at least n+1 counting stages, and further comprising means connecting said logic circuit means to the n+1th stage of said counter means for producing said control signal when n+1 digits are dialed in a telephone number.

* * * * *